(12) United States Patent
Brown et al.

(10) Patent No.: US 7,681,304 B2
(45) Date of Patent: *Mar. 23, 2010

(54) MEMBRANE ELECTRODE ASSEMBLY AND METHOD OF MANUFACTURING A MEMBRANE ELECTRODE ASSEMBLY

(75) Inventors: Eric J. Brown, Voorheesville, NY (US); Megan A. Fannon, Latham, NY (US); Robert S. Hirsch, Troy, NY (US)

(73) Assignee: MTI Micro Fuel Cells, Inc., Albany, NY (US)

( * ) Notice: Subject to any disclaimer, the term of this patent is extended or adjusted under 35 U.S.C. 154(b) by 834 days.

This patent is subject to a terminal disclaimer.

(21) Appl. No.: 11/548,057

(22) Filed: Oct. 10, 2006

(65) Prior Publication Data

US 2007/0128503 A1 Jun. 7, 2007

Related U.S. Application Data

(63) Continuation of application No. 11/015,596, filed on Dec. 17, 2004, now Pat. No. 7,131,190.

(51) Int. Cl.
*B23P 19/00* (2006.01)
*H01M 10/14* (2006.01)

(52) U.S. Cl. .................. 29/759; 29/730; 29/623.3; 29/623.4; 429/32; 429/34; 429/38; 429/127

(58) Field of Classification Search .................. 29/759, 29/729, 730, 623.3, 623.4; 429/32, 34, 38, 429/127
See application file for complete search history.

(56) References Cited

U.S. PATENT DOCUMENTS

| | | | | |
|---|---|---|---|---|
| 4,913,982 A | 4/1990 | Kotchick et al. | | 429/12 |
| 5,290,642 A | 3/1994 | Minh et al. | | 429/33 |
| 5,761,793 A | 6/1998 | Bevers et al. | | 29/623.5 |
| 5,910,378 A * | 6/1999 | Debe et al. | | 429/42 |
| 6,074,692 A * | 6/2000 | Hulett | | 427/115 |
| 6,183,668 B1 * | 2/2001 | Debe et al. | | 252/510 |
| 6,428,584 B1 * | 8/2002 | Debe et al. | | 29/623.1 |
| 6,432,571 B1 * | 8/2002 | Debe et al. | | 429/41 |
| 6,585,846 B1 * | 7/2003 | Hanson et al. | | 156/264 |
| 6,613,106 B1 * | 9/2003 | Debe et al. | | 29/623.3 |
| 6,740,131 B2 | 5/2004 | Schukar et al. | | 29/623.1 |
| 2003/0041444 A1 * | 3/2003 | Debe et al. | | 29/623.1 |
| 2003/0114297 A1 | 6/2003 | Shinn et al. | | 502/159 |
| 2003/0224233 A1 * | 12/2003 | Kohler et al. | | 429/30 |
| 2004/0151961 A1 | 8/2004 | Morishima et al. | | 429/32 |

(Continued)

*Primary Examiner*—Bruce F Bell
(74) *Attorney, Agent, or Firm*—Heslin Rothenberg Farley & Mesiti P.C.; Victor A. Cardona

(57) ABSTRACT

A method for fabricating membrane electrode assembly includes providing an anode side diffusion layer structure and a cathode side diffusion layer structure with a layer of membrane electrolyte therebetween. The diffusion layer structures include diffusion segments, which are coupled to each other by a first engaging member having one or more portions configured for engagement with a feed or aligning mechanism. Also, one or more of the segments of the diffusion layer structures may be connected to other segments or the first engaging member by one or more bridges. Bridges of each diffusion layer structure may be offset to avoid electrical contact with each other in response to diffusion layer structures being assembled with each other and with the layer of membrane electrolyte.

28 Claims, 8 Drawing Sheets

U.S. PATENT DOCUMENTS

2004/0241525 A1* 12/2004 Mekala et al. ............... 429/36
2005/0048349 A1* 3/2005 Fannon et al. ............... 429/36
2005/0238800 A1 10/2005 Shinn et al. ............... 427/115
2007/0087253 A1* 4/2007 Fannon et al. ............... 429/35

* cited by examiner

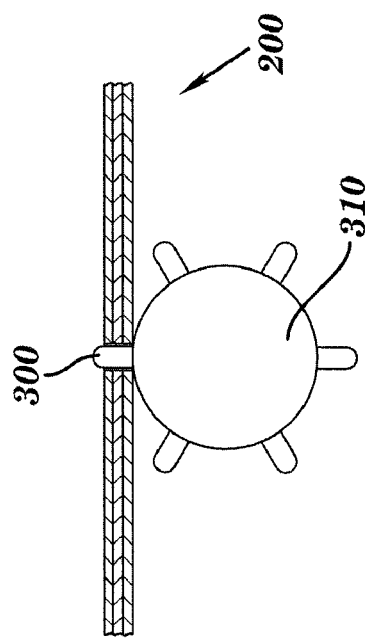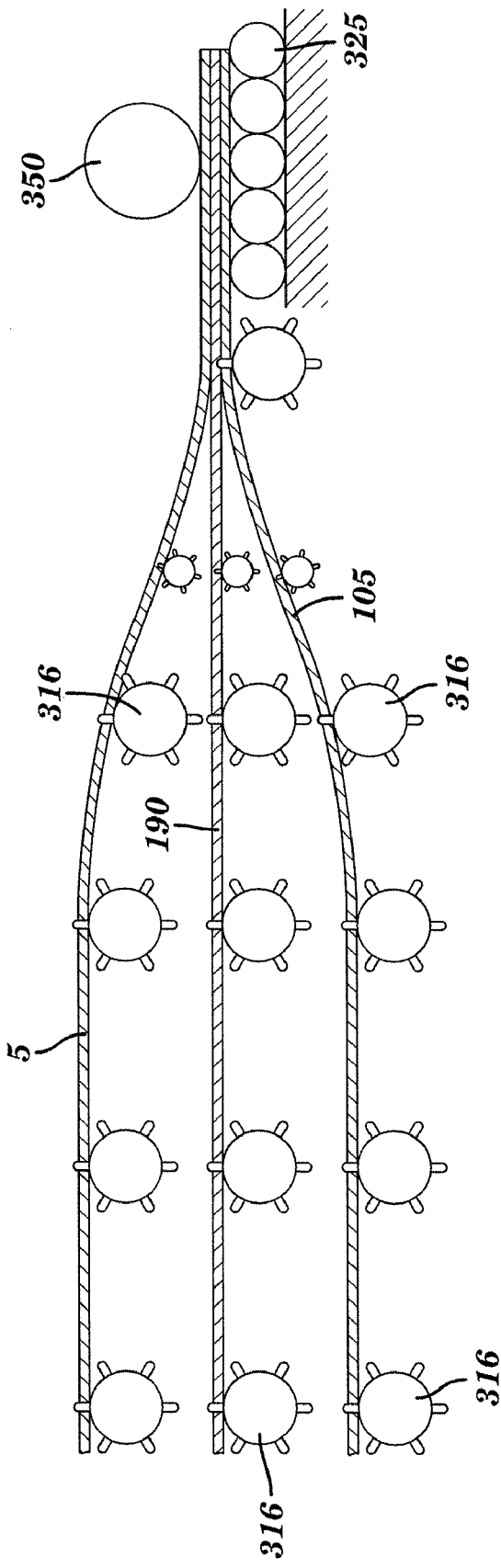

MEMBRANE ELECTRODE ASSEMBLY AND METHOD OF MANUFACTURING A MEMBRANE ELECTRODE ASSEMBLY

CROSS-REFERENCE TO RELATED APPLICATIONS

This application is a Continuation of U.S. patent application Ser. No. 11/015,596, filed Dec. 17, 2004, and entitled "MEMBRANE ELECTRODE ASSEMBLY AND METHOD OF MANUFACTURING A MEMBRANE ELECTRODE ASSEMBLY", now U.S. Pat. No. 7,131,190. The entire disclosure of which is incorporated herein by reference. Also, this application is related to co-owned U.S. application Ser. No. 10/650,424, filed Aug. 28, 2003 now abandoned and entitled "A METHOD OF MANUFACTURING A FUEL CELL ARRAY AND A RELATED ARRAY," the entire disclosure of which is incorporated herein by reference.

FIELD OF THE INVENTION

This invention relates generally to fuel cells, and more particularly, to the manufacture of such fuel cells.

BACKGROUND OF THE INVENTION

Fuel cells are devices in which electrochemical reactions are used to generate electricity. A variety of materials may be suited for use as a fuel depending upon the nature of the fuel cell. Organic materials, such as methanol or natural gas, are attractive fuel choices due to their high specific energy.

Fuel cell systems may be divided into "reformer-based" systems (i.e., those in which the fuel is processed in some fashion to extract hydrogen from the fuel before it is introduced into the fuel cell) or "direct oxidation" systems in which the fuel is fed directly into the cell without the need for separate internal or external processing. Most currently available fuel cells are reformer-based fuel cell systems. However, because fuel processing is complex, and requires expensive components, which occupy comparatively significant volume, the use of reformer based systems is presently limited to comparatively large, high power applications.

Direct oxidation fuel cell systems may be better suited for a number of applications in smaller mobile devices (e.g., mobile phones, handheld and laptop computers), as well as in some larger scale applications. In fuel cells of interest here, a carbonaceous liquid fuel in an aqueous solution (typically aqueous methanol) is applied to the anode face of a membrane electrode assembly (MEA). The MEA contains a layer of membrane electrolye which may be a protonically conductive, but electronically non-conductive membrane (PCM or membrane electrolyte). Typically, a catalyst, which enables direct oxidation of the fuel on the anode aspect of the PCM, is disposed on the surface of the PCM (or is otherwise present in the anode chamber of the fuel cell). In the fuel oxidation process at the anode, the products are protons, electrons and carbon dioxide. Protons (from hydrogen in the fuel and water molecules involved in the anodic reaction) are separated from the electrons. The protons migrate through the PCM, which is impermeable to the electrons. The electrons travel through an external circuit, which includes the load, and are united with the protons and oxygen molecules in the cathodic reaction, thus providing electrical power from the fuel cell.

One example of a direct oxidation fuel cell system is a direct methanol fuel cell system or DMFC system. In a DMFC system, a mixture comprised predominantly of methanol and water is used as fuel (the "fuel mixture"), and oxygen, preferably from ambient air, is used as the oxidizing agent. The fundamental reactions are the anodic oxidation of the methanol and water in the fuel mixture into $CO_2$, protons, and electrons; and the cathodic combination of protons, electrons and oxygen into water. The overall reaction may be limited by the failure of either of these reactions to proceed at an acceptable rate (more specifically, slow oxidation of the fuel mixture will limit the cathodic generation of water, and vice versa).

Direct methanol fuel cells are being developed towards commercial production for use in portable electronic devices. Thus, the DMFC system, including the fuel cell and the other components should be fabricated using materials and processes that are compatible with appropriate form factors, and are cost effective in commercial manufacturing. Furthermore, the manufacturing process associated with a given system should not be prohibitive in terms of associated labor or manufacturing cost or difficulty.

Typical DMFC systems include a fuel source, fluid and effluent management and air management systems, and a direct oxidation fuel cell ("fuel cell"). The fuel cell typically consists of a housing, hardware for current collection and fuel and air distribution, and a membrane electrode assembly ("MEA") disposed within the housing.

A typical MEA includes a centrally disposed, protonically conductive, electronically non-conductive membrane ("PCM"). One example of a commercially available PCM is NAFION® a registered trademark of E.I. Dupont de Nemours and Company, a cation exchange membrane comprised of polyperflourosulfonic acid, in a variety of thicknesses and equivalent weights. The PCM is typically coated on each face with an electrocatalyst such as platinum, or platinum/ruthenium mixtures or alloy particles. On either face of the catalyst coated PCM, the electrode assembly typically includes a diffusion layer. The diffusion layer on the anode side is employed to evenly distribute the liquid fuel mixture across the anode face of the PCM, while allowing the gaseous product of the reaction, typically carbon dioxide, to move away from the anode face of the PCM. In the case of the cathode side, a diffusion layer is used to achieve a fast supply and even distribution of gaseous oxygen across the cathode face of the PCM, while minimizing or eliminating the collection of liquid, typically water, on the cathode aspect of the PCM. Each of the anode and cathode diffusion layers also assist in the collection and conduction of electric current from the catalyzed PCM.

As noted, the MEA is formed of a centrally disposed PCM that is sandwiched between two catalyst layers. The catalyst layers of the MEA in some architectures can be arranged such that a gas diffusion layer (GDL) is adjacent the cathodic catalyst layer to allow oxygen to be transported to the cathode, and a liquid and gas diffusion layer (LDL/GDL) is adjacent the anodic catalyst layer to allow liquid fuel to be transported to the anode, and to allow carbon dioxide to travel away from the anode. Generally, the entire MEA is placed into a frame structure that both compresses the MEA and provides an electron path. Those skilled in the art will recognize that sealing and application of significant pressure can be accomplished in various ways, but these aspects conventionally involve relatively large fastening components, such as screws, nuts and the like. Alternatively, a frame may be insert molded around the MEA in such a fashion that it is supported and compression is applied to the MEA as set forth in co-owned U.S. application Ser. No. 10/650,424, filed Aug. 28, 2003 and entitled "METHOD OF MANUFACTURING A FUEL CELL ARRAY AND A RELATED ARRAY," which is incorporated by reference in its entirety. Regardless of the means by which the MEA is to be incorporated into a fuel cell, it is critical that the components of the MEA be aligned properly, otherwise the performance of the MEA, the fuel cell and the fuel cell system will be compromised.

Typically, MEA fabrication requires that the PCM and diffusion layers are bonded to each other or otherwise in intimate contact with each other. This is presently achieved by applying heat and pressure in a hot pressing or lamination process. More specifically, during fuel cell construction, a membrane electrode assembly is formed which includes a catalyzed membrane and at least one diffusion layer, which are aligned properly and then bonded to each other in a hot press operation. This step is generally labor intensive, and is therefore expensive when applied to multiple MEAs in a serial fashion. It is further possible to bond the MEA components to each other in parallel if multiple diffusion layers are placed on a single, comparatively large sheet of the protonically conductive membrane where the active sites (those areas on the sheet to which a catalyst has been applied) are electrically isolated from each other, but are still part of a contiguous piece of a protonically conductive membrane. Also, the membrane separates opposing gas diffusion layers and electrical contact between such opposing gas diffusion layers is undesirable since it may cause a fuel cell or array to be short-circuited.

As noted above, most or all of the processes for forming a MEA are presently very labor intensive. In particular, the components are assembled by hand and moved from one manufacturing station to another in the same manner. Thus, there is a need for a process for manufacturing and assembling a fuel cell or a fuel cell array, which automates the handling of components of a fuel cell during manufacture thereof to allow mass manufacture of such fuel cells or fuel cell arrays. Further, there is a need for improving the reliability of fuel cells and fuel cell systems by minimizing the variability between MEAs.

It is thus an object of the present invention to provide a cost-effective, highly efficient process for manufacturing a fuel cell or fuel cell array that allows mass manufacture of a fuel cell. It is a further object of the invention to provide a fuel cell that has been produced by such a process.

SUMMARY OF THE INVENTION

The deficiencies and disadvantages of prior techniques have been overcome by the solutions provided by the present invention, which includes a process for manufacturing a fuel cell and an associated fuel cell array that includes: (1) a unique diffusion layer structure that is engageable with a feed mechanism (e.g., a tractor or sprocket) allowing automated movement of the structure; and (2) a process of assembling opposite diffusion layers by which a membrane electrode assembly can be fabricated where the diffusion layers are oriented in such a manner that short circuiting is avoided, and the diffusion layers on opposite aspects of a layer of membrane electrolyte are properly aligned.

More specifically, the present invention provides, in a first aspect, a method for fabricating a membrane electrode assembly for use in a fuel cell. An anode side diffusion layer structure is provided which has at least a first anode side diffusion layer segment and a second anode side diffusion layer segment. The first anode side segment and the second anode side segment are coupled to each other by at least a first engaging member having portions configured for engagement with a feed mechanism, at least one bridge between the segments, or both. One or more of the segments in the anode side diffusion layer structure is designed to engage with a feed mechanism. A cathode side diffusion layer structure includes at least a first cathode side segment and a second cathode side segment which are coupled to each other by at least a first engaging member. The cathode side diffusion layer structure is disposed opposite the anode side diffusion layer structure with respect to a layer of membrane electrolyte. The membrane electrolyte which may also be transported by the feed mechanism, is disposed between the anode side diffusion layer structure and the cathode side diffusion layer structure, and may be bonded to each of the diffusion layer segments thereof. The membrane electrolyte is typically coated with a catalyst on one or both of it's major aspects, although it is further possible that at least a portion the catalyst may be disposed on one or more of the diffusion layer structures. The anode side diffusion layer structure is assembled atop the cathode side diffusion layer structure and with the layer of membrane electrolyte sandwiched therebetween such that the first engaging member and the second engaging member are aligned to engage the feed mechanism to allow the anode side diffusion layer structure and the cathode side diffusion layer structure to be moved. The bridges connecting segments in the anode side diffusion layer structure with adjacent segments, and the engaging member may or may not be offset from the bridges in the corresponding cathode side diffusion layer structure. Specifically, the bridges or shortened bridge portions may be offset to avoid electrical contact when the anode side diffusion layer structure, the cathode side diffusion layer structure and the layer of membrane electrolyte are bonded to each other and trimmed (e.g., the bridge thereof may be completely or partially removed).

The present invention provides, in a second aspect, a membrane electrode assembly manufactured by the process of the first aspect described above.

The present invention provides, in a third aspect, a membrane electrode assembly to be integrated into a fuel cell and/or a fuel cell system. The assembly includes an anode side diffusion layer structure and a cathode side diffusion layer structure. The anode side diffusion layer structure includes a first gas diffusion segment and a second diffusion segment, which are coupled to each other by a first engaging member having portions configured to engage a feed mechanism. Similarly, the cathode side diffusion layer structure has a first diffusion segment and a second diffusion segment, which are coupled to each other by a similar engaging member having portions configured to engage the feed mechanism. A layer of membrane electrolyte is sandwiched between the anode side diffusion layer structure and the cathode side diffusion layer structure such that the first engaging member and the second engaging member are aligned to engage the feed mechanism to allow the anode side diffusion layer structure and the cathode side diffusion layer structure to be moved through the assembly process while maintaining the alignment of the MEA components.

The present invention provides, in a fourth aspect, a method for fabricating a membrane electrode assembly for use in a fuel cell. The method includes providing an anode side diffusion layer structure having at least a first anode side segment and a second anode side segment. The first segment and the second segment are connected to each other via at least a first bridge. A corresponding cathode side diffusion layer structure is provided which also includes a first cathode side segment and a second cathode side segment. The first cathode side segment and the second cathode side segment are similarly connected to each other via at least a second bridge. A layer of membrane electrolyte is sandwiched between the anode side diffusion layer structure and the cathode side diffusion layer structure such that the anode side diffusion layer structure and the cathode side diffusion layer structure avoid electrical contact with each other.

Also, the present invention provides, in a fifth aspect, a membrane electrode assembly manufactured by the process described in the fourth aspect.

The present invention provides, in a sixth aspect, a membrane electrode assembly for use in fabricating a fuel cell which includes an anode side diffusion layer structure, a layer of membrane electrolyte, and a cathode side diffusion layer structure. The anode side diffusion layer structure has at least a first anode side segment and a second anode side segment which are connected to each other via at least a first bridge. The cathode side diffusion layer structure has a first cathode side segment and a second cathode side segment connected to each other via at least a second bridge. The layer of membrane electrolyte is sandwiched between the anode side diffusion layer structure and the cathode side diffusion layer structure such that the anode side diffusion layer structure and the cathode side diffusion layer structure avoid electrical contact with each other.

The present invention provides, in seventh aspect, a diffusion layer assembly which includes a first diffusion segment and a second diffusion segment connected to an engaging member configured to engage an alignment mechanism to allow the diffusion layer assembly to be aligned with other components, including but not limited to current collectors or supporting components, during MEA assembly or assembly of the fuel cell.

The present invention provides, in an eighth aspect, a membrane electrode assembly for use in fabricating a fuel cell which includes an anode side diffusion layer structure, a cathode side diffusion layer structure, and a layer of membrane electrolyte therebetween. The anode side diffusion layer structure includes a first anode side segment and a second anode side segment which have been electrically and/or mechanically separated from each other by at least partial removal of a bridge that connects the anode side segments. The cathode side diffusion layer structure includes a first cathode side segment and a second cathode side segment which have been separated from each other by at least partial removal of a second bridge that connects the cathode side segments. The membrane electrolyte is sandwiched between the anode side diffusion layer structure and the cathode side diffusion layer structure such that the anode side diffusion layer structure and the cathode side diffusion layer structure avoid electrical contact with each other.

The present invention provides, in a ninth aspect, a method for fabricating a membrane electrode assembly for use in a fuel cell which includes providing an anode side diffusion layer structure coupled to a first engaging member having one or more portions configured for engagement with an alignment mechanism. A cathode side diffusion layer structure is provided which is coupled to a second engaging member having one or more portions configured for engagement with the alignment mechanism. A layer of membrane electrolyte is sandwiched between the anode side diffusion layer structure and the cathode side diffusion layer structure such that the diffusion layer structures are not in electrical contact with each other.

The present invention provides, in a tenth aspect, a diffusion layer assembly for use in fabricating a membrane electrode assembly for a fuel cell which includes at least one diffusion layer structure connected to an engaging member having one or more portions configured for engagement with an alignment mechanism.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description of preferred embodiments taken in conjunction with the accompanying drawings in which:

FIG. 6 is a side cross-sectional view of the structure of FIG. 1 engaged with one type of feed mechanism;

FIG. 7 is a side cross-sectional view of the assembly of FIG. 4 being assembled together using several feed mechanisms;

DETAILED DESCRIPTION OF AN ILLUSTRATIVE EMBODIMENT

In accordance with the principles of the present invention, a membrane electrode assembly for use in fabricating a fuel cell is provided. The membrane electrode assembly includes an anode side diffusion layer structure and a cathode side diffusion layer structure. The anode side diffusion layer structure has a plurality of anode side segments with one or more of the anode side segments being connected to at least one adjacent anode side segment by at least one bridge. Similarly, the cathode side diffusion layer structure has a plurality of cathode side segments with one or more of the cathode side segments being connected to at least one adjacent segment by at least one bridge. A layer of membrane electrolyte is disposed (e.g., sandwiched) between the anode side diffusion layer structure and the cathode side diffusion layer structure such that the anode side diffusion layer structure and cathode side diffusion layer structure avoid electrical contact with each other. The layer of membrane electrolyte (e.g., a layer of protonically conductive and electronically non-conductive membrane) has catalyst coatings on each of its major surfaces. The anode side diffusion layer structure and/or the cathode side diffusion layer structure include an engaging member (e.g., a track, or feed border such as a tractor feed border) configured to engage a feed mechanism (e.g., a tractor or sprocket) to allow the anode side diffusion layer structure and/or the cathode side diffusion layer structure to be moved by such a feed mechanism.

Figure 1:
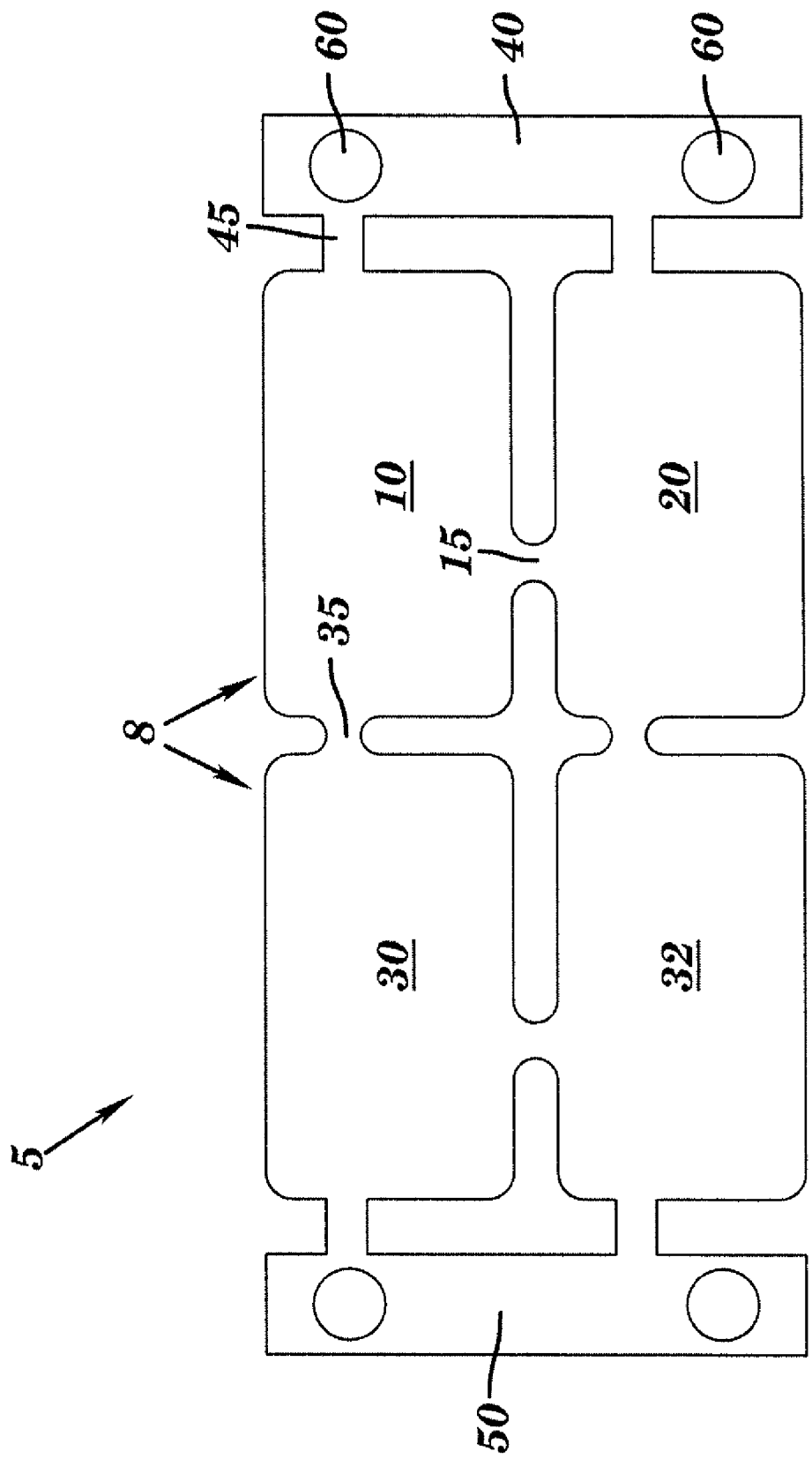
FIG. 1 is a top elevational view of an anode side diffusion layer structure.

FIG. 1 depicts an anode side diffusion layer structure 5 having a plurality of segments 8 of a diffusion layer material. The diffusion layer material is selected for its ability to allow reactants to reach the active catalytic surface of the membrane electrolyte while allowing the products of the energy producing reaction to move away from the catalyzed membrane electrolyte. For example, plurality of segments 8 allows the flow of reactants towards the membrane electrolyte and the flow of products away from the membrane electrolyte t. A first segment 10 of plurality of segments 8 is also connected to a second segment 20 by a bridge 15. First segment 10 also is connected to a third segment 30 by a bridge 35. First segment 10 is connected to an engaging member (e.g., a tractor feed border or track 40) by an engaging member bridge, e.g., a track bridge 45. Track 40 may, but need not, include a plurality of features such as openings 60 (e.g., a tractor or sprocket gripping portions) configured to receive moveable spokes 300 (FIG. 6) of a feed mechanism (e.g., a tractor or sprocket 310) (FIG. 6). The engagement of such movable spokes allows tractor or sprocket 310 to move the diffusion layer structure 5 by rotation of sprocket 310 when spokes 300 are inserted in openings 60 of track 40 and/or a second track 50. Such movement of anode side diffusion layer structure 5 by sprocket 310 facilitates the automation and/or mass manufacture of a fuel cell or fuel cell array since certain steps of the assembly of a fuel cell or fuel cell array may be performed by, or aided by, such a feed mechanism instead of being manually performed. The speed of such assembly may also be increased by use of such a feed mechanism and corresponding diffusion layer structure.

Figure 2:
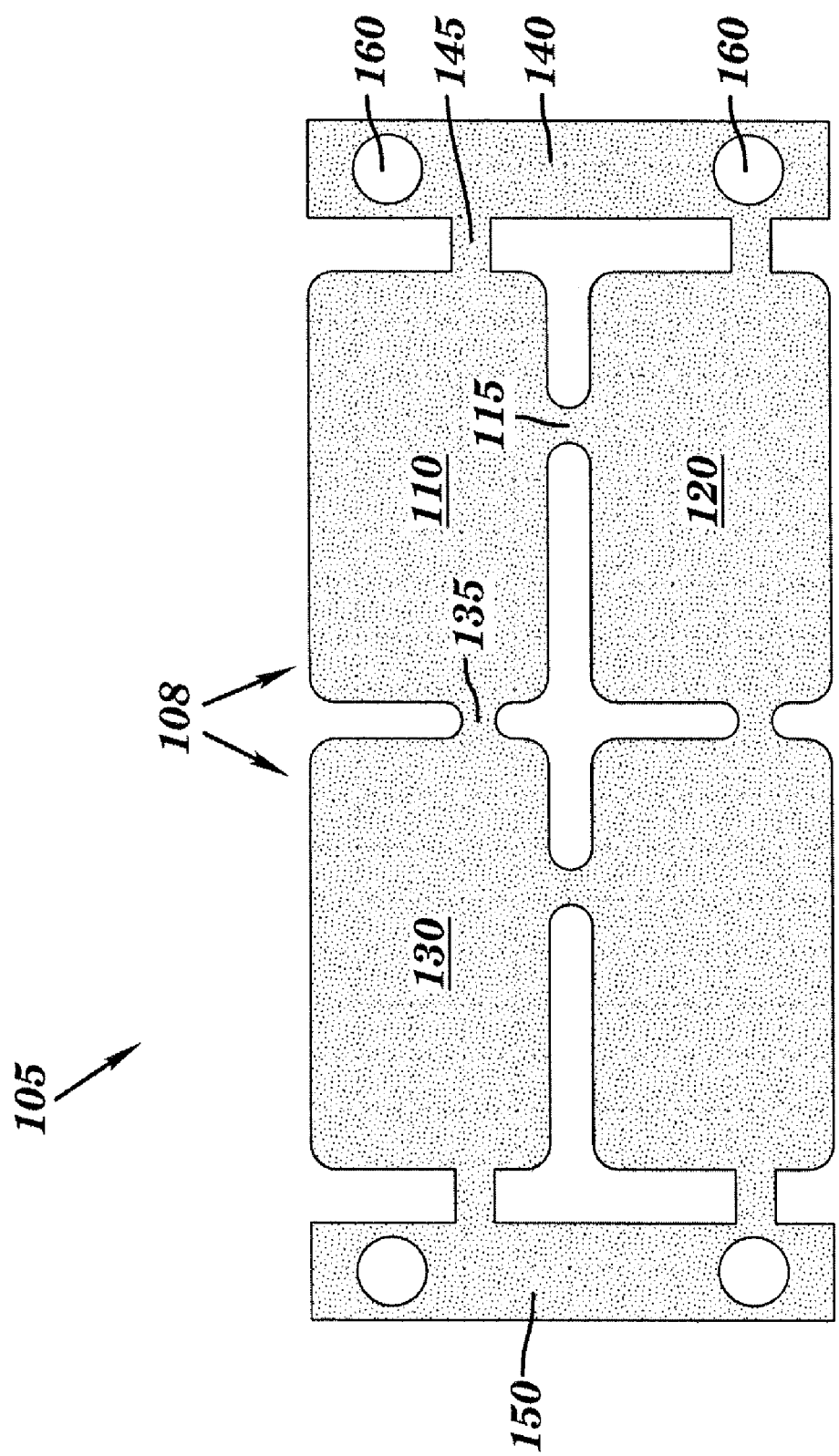
FIG. 2 is a top view of a cathode side diffusion layer structure having bridges offset relative to the structure of FIG. 1.

FIG. 2 depicts a cathode side diffusion layer structure 105 that is similar in shape but oriented differently than anode side diffusion layer structure 5. For example, cathode side diffusion layer structure 105 may be substantially the same shape as the anode side diffusion layer structure 5, but may be oriented 180 degrees relative to anode side diffusion layer structure 5 (e.g., cathode side diffusion layer structure 105 may be rotated 180 degrees relative to anode side diffusion layer structure 5 during manufacture of a fuel cell). Cathode side diffusion layer structure 105 may include a plurality of segments 108 of a material configured to act as a diffusion layer in a fuel cell (including, but not limited to the material from which the anode side diffusion layer structure is formed). For example, plurality of segments 108 allows the flow of reactants towards the membrane electrolyte and the flow of products away from the membrane electrolyte. A first segment 110 is connected to a second segment 120 by a bridge 115. First segment 110 also is connected to a third segment 130 by a bridge 135. First segment 110 is connected to an engaging member (e.g., a tractor feed border or track 140) by an engaging member bridge, e.g., a track bridge 145. Track 140 may include a plurality of openings 160 configured (i.e. dimensioned and shaped) to receive spokes of a feed mechanism (e.g., tractor or sprocket 310) configured to move cathode side diffusion layer structure 105. As described for anode side diffusion layer structure 5, the movement of the feed mechanism (e.g., sprocket 310) when the spokes are inserted in openings 160 may cause cathode side diffusion layer structure 105 to move during fuel cell assembly.

Figure 3:
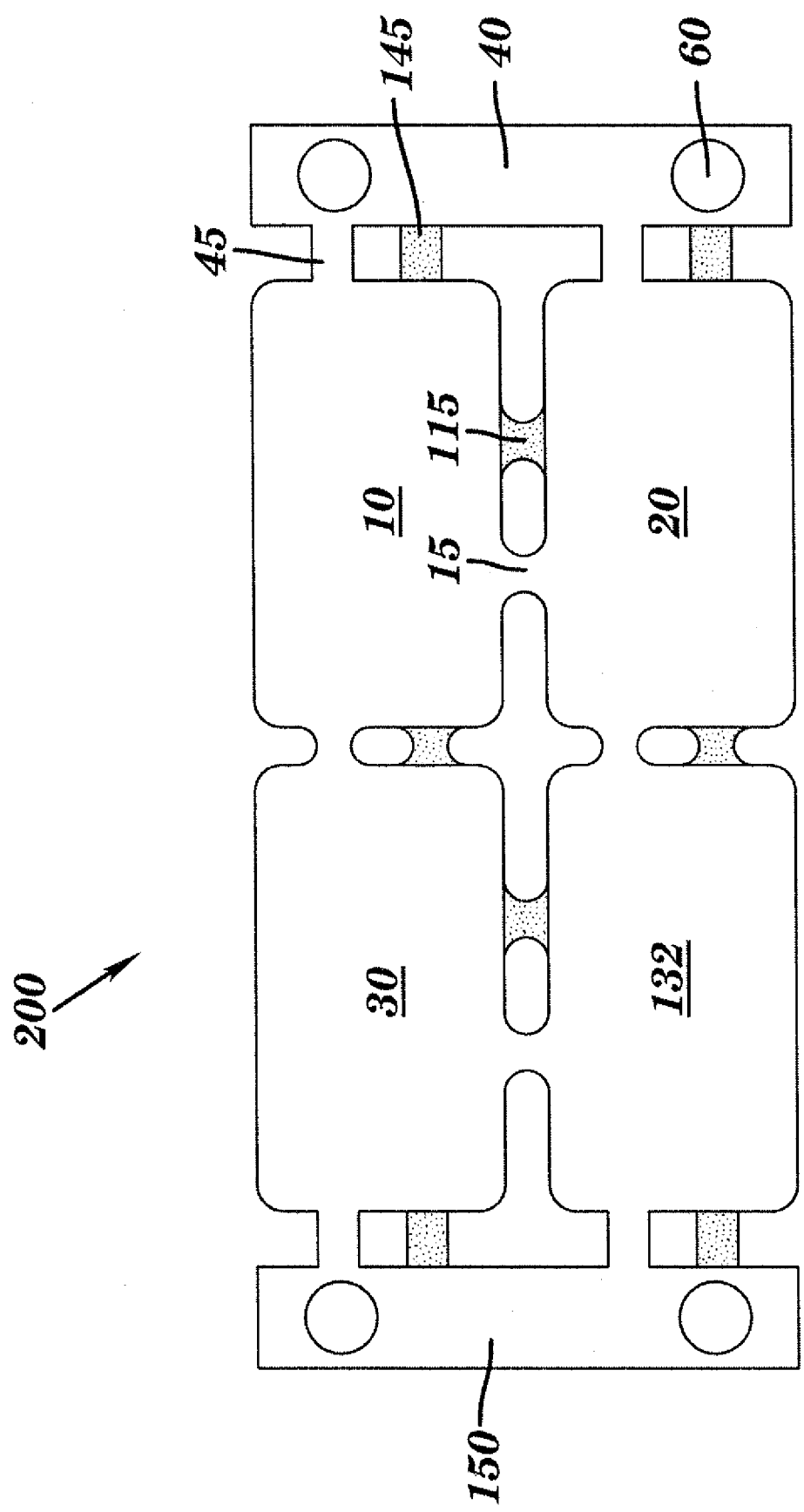
FIG. 3 is a top view of the structure of FIG. 1 and the structure of FIG. 2 assembled together with a membrane electrolyte therebetween being omitted in this figure.
Figure 4:
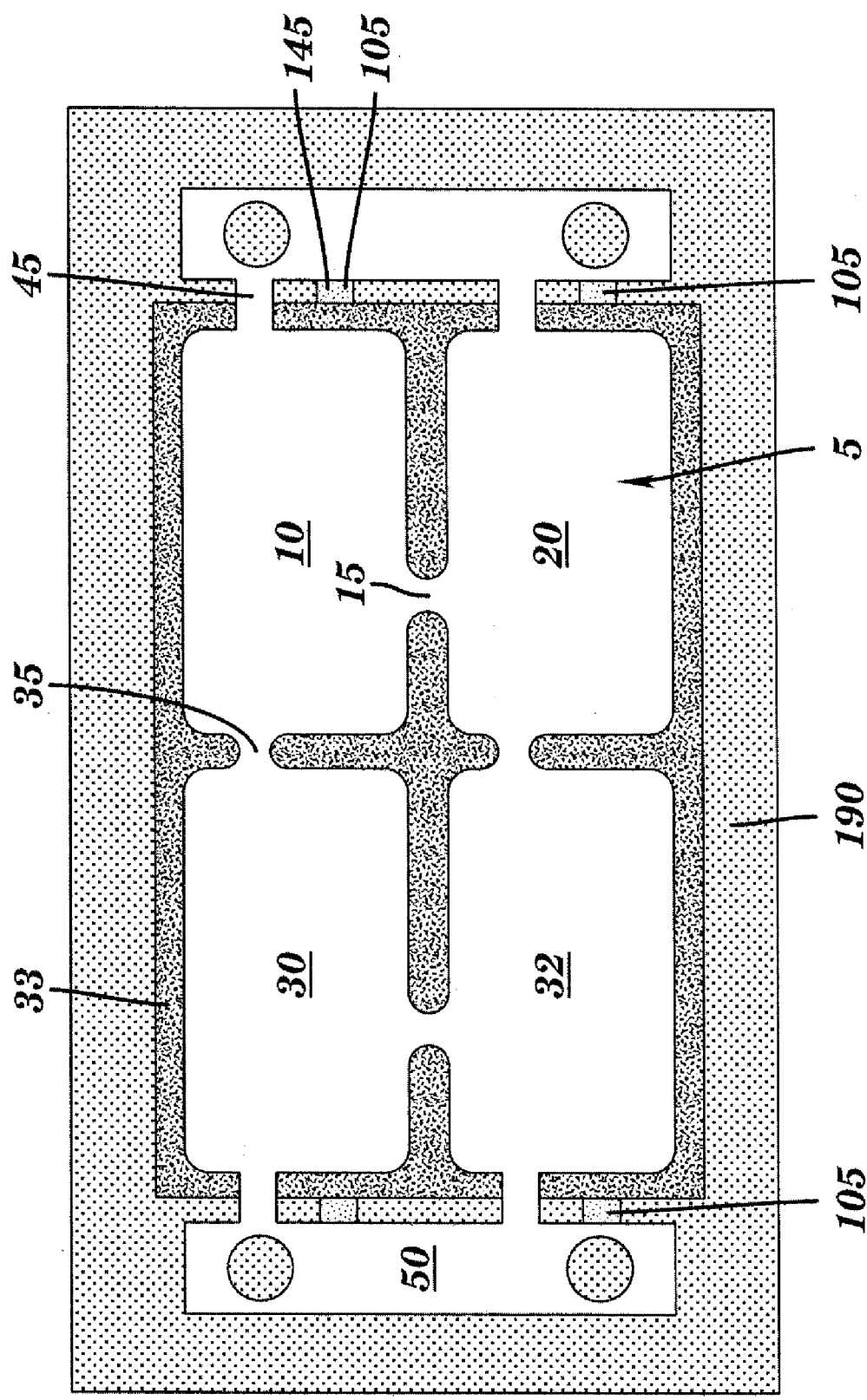
FIG. 4 is a top view of a catalyst coated membrane electrolyte sandwiched between the anode side diffusion layer structure of FIG. 1 and the cathode side diffusion layer structure of FIG. 2 to a form a membrane electrode assembly shown in a manner such that at least a portion of the anode diffusion layer structure and cathode diffusion layer structure are both visible.
Figure 5:
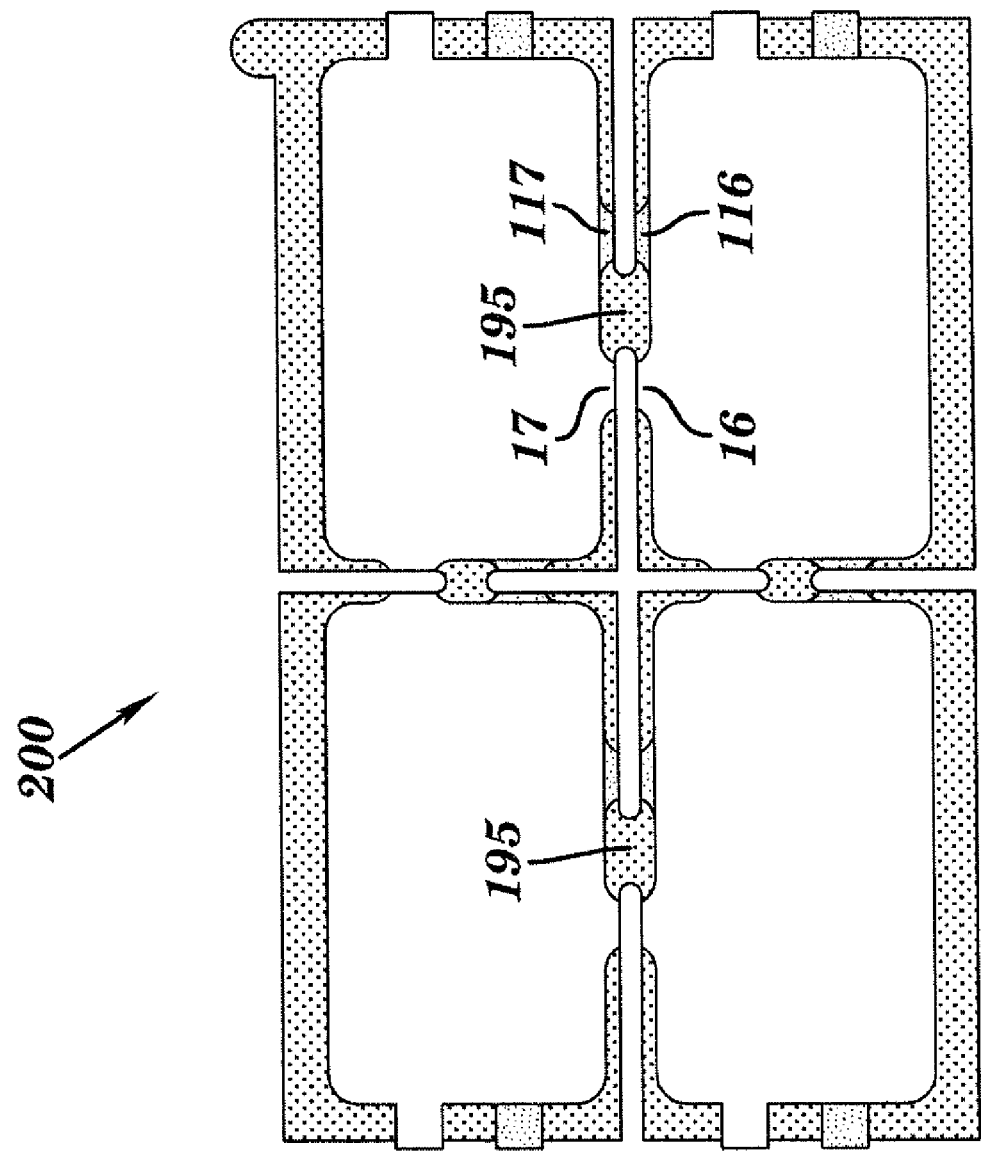
FIG. 5 is a top view of the structure of FIG. 4 after the bridges between diffusion layer segments have been trimmed, while the membrane electrolyte bridges are maintained for mechanical integrity.

A protonically conductive membrane 190 (FIG. 4) with catalyst coatings in intimate contact with its major surfaces is disposed between anode side diffusion layer structure 5 and cathode side diffusion layer structure 105 as depicted in FIGS. 3-5. Protonically conductive membrane 190 is disposed between anode side diffusion layer structure 5 and cathode side diffusion layer structure 105 to form a membrane electrode assembly (MEA) 200 (FIG. 5). Protonically conductive membrane 190 is also electronically non-conductive and, for example, may be formed of NAFION®, a registered trademark of E.I. Dupont de Nemours and Company, which is based on a polyperflourosulfonic acid and is available in a variety of thicknesses and equivalent weights. The membrane is typically coated on each of its major surfaces with an electrocatalyst such as platinum or a platinum/ruthenium mixture or alloyed particles 33 (shown in FIG. 4, as being partially occluded by the anode diffusion layer structure). Alternatively, the electrocatalyst may be disposed on the anode side diffusion layer or the cathode side diffusion layer, and then placed in intimate contact with the protonically conductive membrane during the assembly process. One face of membrane 190 is an anode face or anode aspect, which abuts anode side diffusion layer structure 5. The opposing face of membrane 190 is on the cathode side and is herein referred to as the cathode face or the cathode aspect, which abuts cathode side diffusion layer structure 105, for example.

Anode side diffusion layer structure 5 and cathode side diffusion layer structure 105 may be formed of materials known to those skilled in the art, including but not limited to carbon paper, carbon cloth, silicon, ceramics, metallic substances, and/or microporous plastics. The diffusion layer must be electrically conductive, and various additives or coatings may be added or applied to achieve desired properties. Also, the engaging members (e.g., track 40 and a second track 50) may be formed of the same material as the diffusion layer structures. Alternatively, the engaging members (e.g., track 40 and second track 50) may be connected to, but formed of a different material than the diffusion layer structures (e.g., anode side diffusion layer structure 5 and cathode side diffusion layer structure 105).

MEA 200 may be assembled using a feed mechanism (e.g., tractor or sprocket 310 depicted in FIG. 6) or a plurality of feed mechanisms. More specifically, anode side diffusion layer structure 5, cathode side diffusion layer structure 105 and protonically conductive membrane 190 may be assembled together and aligned using sprocket 310 (FIG. 6) which may manipulate track 40, track 140 and, optionally, a track (not shown) connected to protonically conductive membrane 190, for example. Alternatively, a plurality of sprockets 316 could be utilized to move and align the diffusion layer structures and the membrane electrolyte to form an MEA as depicted in FIG. 7. Also, MEA 200 could be assembled with other fuel cell components using such feed mechanisms. Components used to fabricate MEA 200 may be laminated, hot pressed, ultrasonically bonded or otherwise bonded to each other using methods known to those skilled in the art or other yet unknown fabrication techniques, while still remaining within the scope of the present invention.

The bridges of anode side diffusion layer structure 5 and cathode side diffusion layer structure 105 may be offset when assembled in an MEA such that they avoid electrical contact with each other. For example, bridge 45 and bridge 145 (FIG. 3), along with bridge 15 and bridge 115, are positioned such that they avoid electrical contact when anode side diffusion layer structure 5 is assembled with cathode side diffusion layer structure 105, as depicted in FIG. 3.

Anode side diffusion layer structure 5, cathode side diffusion layer structure 105, and membrane 190 may be bonded (e.g., laminated) together by applying heat and pressure to anode side diffusion layer structure 5 and/or cathode side diffusion layer structure 105 via heat pressing or heat rolling. For example, as shown in FIG. 7, heat presses or heat rollers 350 may apply heat and/or pressure to individual segment(s) of anode side diffusion layer structure 5 (e.g., segment 10, segment 20, segment 30, and a segment 32) or cathode side diffusion layer structure 105 (e.g., segment 110, segment 120, segment 130, and a segment 132). In one example, the edges of each diffusion layer structure may be bonded to vertically corresponding segments by heating, ultrasonic welding or using other methods know to those skilled in the art. Such heating may be performed while anode side diffusion layer structure 5, cathode side diffusion layer structure 105, and membrane 190 are engaged with one or more feed mechanisms (e, g., tractors or sprockets 310, 316). Also, the components of MEA 200 may be moved by such tractor or sprockets to a location for heating. Further, the use of heat rollers allows heat to be applied by the rollers as MEA 200 moves on the feed mechanism(s) (e.g., tractor or sprocket 310 or tractor or sprockets 316). Optional opposing roller 325 may also be utilized opposite heat roller 350. Opposite rollers 325 may be heated or unheated. Also, heat roller 350 could be replaced with an unheated roller (not shown) or a press which could be heated or unheated.

As depicted in FIG. 5, MEA 200 may be trimmed or cut to remove connecting portions of the bridges (e.g. bridge 45, bridge 145, bridge 15, and bridge 115) between the segments of anode side diffusion layer structure 5 and cathode side diffusion layer structure 105 to electrically disconnect adjacent segments (e.g., segment 10 and segment 20). For example, the removal of such connecting portions may result in shortened opposed bridge portions (e.g., shortened bridge portion 116, shortened bridge portion 117, shortened bridge portion 16, and shortened bridge portion 17) between the segments. Also, membrane 190 may be cut to remove portions of the membrane between the segments (e.g., segment 10, segment 20, segment 110, and segment 120) of the diffusion layer structures to leave membrane-connecting portions 195 connecting the segments mechanically. Alternatively, the segments could be held together by membrane connecting portions 195 and engaging members (e.g., track 40 and track 140) connected to the segments by engaging member bridges (e.g., track bridge 45 and track bridge 145). The shortened bridge portions continue to be offset as are the bridges before they were are trimmed (using die cutting or other methods known to those skilled in the art) thereby avoiding electrical contact between the shortened bridge portions, e.g., between shortened bridge portion 116 and shortened bridge portion 16. Alternatively, all of each bridge may be removed such that no shortened bridge portions remain.

Connecting portions 195, track 40 and/or track 140 may be used to maintain the alignment of the components of the membrane electrode assembly 200 together to allow further operations thereon and to improve ease of handling. For example, MEA 200 may be integrated with other components (e.g. gaskets, current collectors, fuel reservoirs) into a fuel cell array or fuel cell assembly as described for example in co-owned U.S. application Ser. No. 10/650,424, filed Aug. 28, 2003 and entitled "A METHOD OF MANUFACTURING A FUEL CELL ARRAY AND A RELATED ARRAY". Alternatively, MEA 200 could be fastened to other components to form such an array or assembly using methods known to those skilled in the art. By way of example, and not limitation, an MEA may be disposed between frame components that are integrated or mechanically fastened to each other. MEA 200, anode side diffusion layer structure 5, cathode side diffusion layer structure 105, or membrane 190 can also be further trimmed or cut. For example, the engaging members (e.g., track 40) could be removed.

Although the diffusion layer structures, MEA and any corresponding fuel cell arrays depicted in the figures include four segments, other configurations and numbers of segments are possible and are within the scope of the present invention.

As described above, the intentional offset of the bridges between the segments of the diffusion layer structures inhibits electrical contact between the bridges when the diffusion layer structures are assembled in such a fashion that they abut the two major aspects of the membrane electrolyte. The elimination of electrical contact between the segments of the diffusion layer structures on opposite sides of the membrane prevents electrical short circuiting between the segments of the opposed diffusion layer structures, allowing for more efficient operation of the fuel cell and fuel cell system. For example, the lateral displacement of bridge 15 relative to bridge 115, and the displacement of bridge 35 relative to bridge 135, prevents any electrical connection between the bridges of the opposite diffusion layer structures when the diffusion layer structures are assembled together.

Further, although the process described includes assembling the diffusion layer structures to each other with a membrane electrolyte therebetween by utilizing a feed mechanism and tracks or other engagable members, it is possible that additional layers could be assembled into an MEA or other components could be fabricated in conjunction with an MEA by utilizing a feed mechanism such as a tractor and sprockets and corresponding engaging member(s) that are integrated into or otherwise part of the additional component. Also an assembled MEA could be combined with other components (e.g. current collector, housing, fuel reservoir, water collector, gaskets, sensors, valves, pumps, etc.) to form a fuel cell such as by fastening or molding the MEA to other components to form a molded fuel cell or fuel cell array. Further, the diffusion layer structures could be attached to each other with the membrane therebetween using methods well known to those skilled in the art including but not limited to ultrasonic welding or lamination, chemically adhering components to each other, heat staking, or thermal bonding.

It is further within the scope of the invention that engaging members (e.g., track 40) could include various means of gripping a tractor or sprocket or other movement-inducing device (i.e., feed mechanism) to allow movement of the diffusion layer structures or other fuel cell components. Also, the engaging members (e.g., tracks) could be utilized to align diffusion layer structures atop one another without engaging a feed mechanism to provide movement thereof. In particular, the engaging members may be utilized simply to align the diffusion layer structures and/or other components atop one another, and provide utility even in an assembly process where there is no linear movement in the assembly process. In this situation, the feed mechanism may simply be referred to as an aligning mechanism and the engaging member may be referred to as an alignment member.

Figure 8:
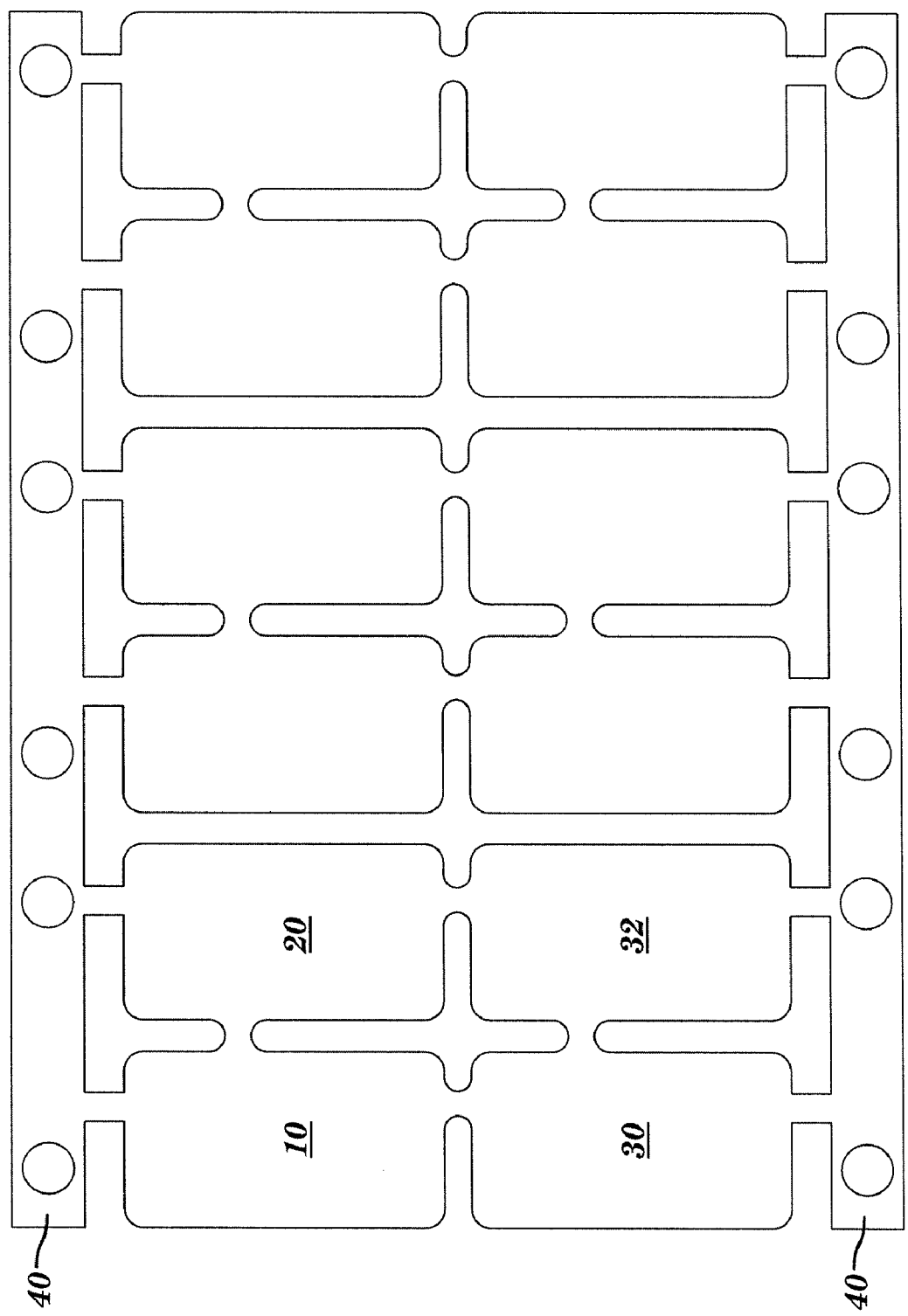
FIG. 8 is a top elevational view of a plurality of diffusion layer structures coupled to each other by parallel engaging members.
Figure 9:
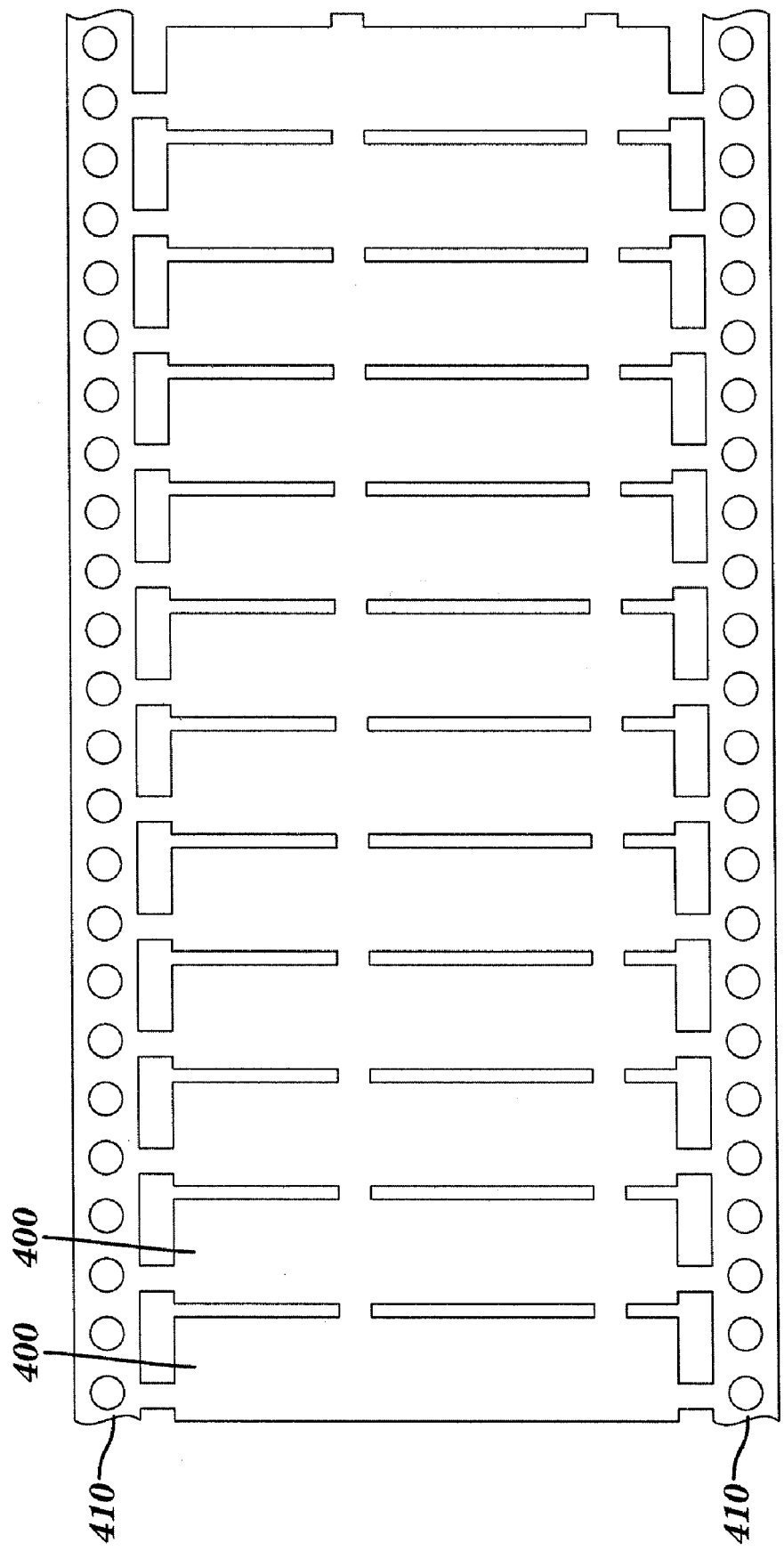
FIG. 9 is a top elevational view of a plurality of diffusion layer segments comprising a single diffusion layer structure coupled to each other by parallel engaging members.

Although the figures described above depict four diffusion layer segments connected to each other and one or more aligning members or engaging members (e.g., track 40), a plurality of diffusion layer structures, each consisting of four segments may be connected to such aligning or engaging members as depicted in FIG. 8, for example. Also, in an example depicted in FIG. 9, a string of segments 400 may be connected to each other and to one or more aligning or engaging members (e.g., a track 410) while being connected to another segment in a direction toward the aligning or feed mechanism. It should be understood that in some embodiments of the invention, a segment may be attached to only one other segment or to a track.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A membrane electrode assembly for use in fabricating a fuel cell, the assembly manufactured by a process comprising the steps of:
   providing an anode side diffusion layer structure having a first anode side segment and a second anode side segment, said first anode side segment and said second anode side segment coupled to a first engaging member having one or more portions configured for engagement with a feed mechanism;
   providing a cathode side diffusion layer structure having a first cathode side segment and a second cathode side segment, said first cathode side segment and said second cathode side segment coupled to a second engaging member having one or more portions configured for engagement with the feed mechanism;
   sandwiching a layer of membrane electrolyte between said anode side diffusion layer structure and said cathode side diffusion layer structure such that said first engaging member and said second engaging member are aligned to engage the feed mechanism to allow said anode side diffusion layer structure and said cathode side diffusion layer structure to be moved.

2. A method for fabricating a membrane electrode assembly for use in a fuel cell, comprising:
   providing an anode side diffusion layer structure having a first anode side segment and a second anode side segment, the first anode side segment connected to said second anode side segment or a first engaging member via a first bridge;
   providing a cathode side diffusion layer structure having a first cathode side segment and a second cathode side segment, the first cathode side segment connected to the second cathode side segment or a second engaging member via a second bridge;
   sandwiching a layer of a membrane electrolyte between the anode side diffusion layer structure and the cathode side diffusion layer structure such that the anode side diffusion layer structure and the cathode side diffusion layer structure avoid electrical contact with each other.

3. The method of claim 2 wherein the layer of membrane electrolyte is sandwiched between the anode side diffusion layer structure and the cathode side diffusion layer structure such that the first bridge and the second bridge are vertically offset.

4. The method of claim 2 further comprising removing at least a portion of the first bridge to electronically disconnect the first anode side segment and the second anode side segment and removing at least a portion of the second bridge to electronically disconnect the first cathode side segment and the second cathode side segment.

5. The method of claim 4 further comprising bonding the anode side diffusion layer structure, the layer of membrane electrolyte and the cathode side diffusion layer structure to each other.

6. The method of claim 5 wherein the bonding comprises providing heat to at least one of the anode side diffusion layer structure and the cathode side diffusion layer structure.

7. The method of claim 6 wherein the providing the heat comprises providing heat by at least one of heat pressing and heat rolling.

8. The method of claim 2 further comprising coupling the first anode side segment and the second anode side segment to a first engaging membrane and coupling the first cathode side segment and the second cathode side segment to a second engaging member.

9. The method of claim 2 wherein the sandwiching comprises sandwiching such that the first engaging member and the second engaging member are aligned to engage a feed mechanism to allow the anode side diffusion layer structure and the cathode side diffusion layer structure to be moved.

10. The method of claim 9 wherein the layer of membrane electrolyte comprises a third engaging member and wherein the sandwiching between the anode side diffusion layer structure and the cathode side diffusion layer structure comprises sandwiching such that the third engaging member is aligned to engage the feed mechanism.

11. The method of claim 10 wherein the feed mechanism comprises a tractor or sprocket and at least one of the first engaging member, the second engaging member, and the third engaging member comprise an opening to engage a spoke of the tractor or sprocket.

12. The method of claim 2 further comprising contacting the layer of membrane electrolyte with an electrocatalyst.

13. The method of claim 2 further comprising removing at least one of a first engaging member and the second engaging member.

14. A membrane electrode assembly for use in fabricating a fuel cell, comprising:
   an anode side diffusion layer structure having a first anode side segment and a second anode side segment, said first anode side segment connected to said second anode side segment or a first engaging member via a first bridge;
   a cathode side diffusion layer structure having a first cathode side segment and a second cathode side segment, said first cathode side segment connected to said second cathode side segment or a second engaging member via a second bridge;
   a layer of membrane electrolyte sandwiched between said anode side diffusion layer structure and said cathode side diffusion layer structure such that said anode side diffusion layer structure and said cathode side diffusion layer structure avoid electrical contact with each other.

15. The assembly of claim 14 wherein said first bridge and said second bridge are vertically offset.

16. The assembly of claim 14 wherein at least a portion of said first bridge is removed such that said first anode side segment and said second anode side segment are electrically disconnected from each other.

17. The assembly of claim 14 wherein at least a portion of said second bridge is removed such that said first cathode side segment and said second cathode side segment are electrically disconnected from each other.

18. The assembly of claim 14 wherein said first anode side segment and said second anode side segment are coupled to each other by a first engaging member and said first cathode side segment and said second cathode side segment are coupled to each other by a second engaging member such that said first engaging member and said second engaging member are aligned to engage a tractor or sprocket to allow said anode side diffusion layer structure and said cathode side diffusion layer structure to be moved by the tractor or sprocket.

19. The assembly of claim 18 wherein said first anode side segment comprises a first engaging member bridge connecting said first anode side segment to said first engaging member and said second anode side segment comprises a second engaging member bridge connecting the second anode side segment to said second engaging member.

20. The assembly claim 14 wherein said first anode side segment and said second anode side segment are coupled to a first engaging member and said first cathode side segment and said second cathode side segment are coupled to a second engaging member, said first engaging member and said second engaging member configured to engage a feed mechanism.

21. The assembly of claim 20 wherein said layer of membrane electrolyte comprises a third engaging member and wherein said anode side diffusion layer structure, said cathode side diffusion layer structure and said layer of membrane electrolyte are assembled such that said first engaging member, said second engaging member, and said third engaging member are aligned to engage the feed mechanism.

22. The assembly of claim 21 wherein the feed mechanism comprises a tractor or sprocket and at least one of said first engaging member, said second engaging member, and said third engaging member comprise an opening to engage a spoke of the tractor or sprocket.

23. The assembly of claim 14 wherein said layer of membrane electrolyte contacts an electrocatalyst.

24. A membrane electrode assembly for use in fabricating a fuel cell, the assembly manufactured by a process comprising the steps of:
 providing an anode side diffusion layer structure having a first anode side segment and a second anode side segment, said first anode side segment connected to said second anode side segment or a first engaging member via a first bridge;
 providing a cathode side diffusion layer structure having a first cathode side segment and a second cathode side segment, said first cathode side segment connected to said second cathode side segment or a second engaging member via a second bridge; and
 sandwiching a layer of membrane electrolyte between said anode side diffusion layer structure and said cathode side diffusion layer structure such that said anode side diffusion layer structure and said cathode side diffusion layer structure avoid electrical contact with each other.

25. A membrane electrode assembly for use in fabricating a fuel cell, comprising:
 an anode side diffusion layer structure having a first anode side segment and a second anode side segment, wherein said first anode side segment and said second anode side segment have been separated from each other by at least a partial removal of a first bridge therebetween;
 a cathode side diffusion layer structure having a first cathode side segment and a second cathode side segment, wherein said first cathode side segment and said second cathode side segment have been separated from each other by at least a partial removal of a second bridge therebetween; and
 a membrane electrolyte sandwiched between said anode side diffusion layer structure and said cathode side diffusion layer structure such that the anode side diffusion layer structure and the cathode side diffusion layer structure avoid electrical contact with each other.

26. The membrane electrode assembly of claim 25 wherein said first bridge comprises a first engaging member bridge and said second bridge comprises a second engaging member bridge.

27. The membrane electrode assembly of claim 25 wherein said first bridge and said second bridge are vertically offset.

28. A method for fabricating a membrane electrode assembly for use in a fuel cell, comprising:
 providing an anode side diffusion layer structure coupled to a first engaging member having one or more portions configured for engagement with an alignment mechanism;
 providing a cathode side diffusion layer structure coupled to a second engaging member having one or more portions configured for engagement with the alignment mechanism;
 sandwiching a layer of membrane electrolyte between the anode side diffusion layer structure and the cathode side diffusion layer structure such that the first engaging member and the second engaging member are aligned to engage the alignment mechanism; and
 bonding the membrane electrolyte to the anode side diffusion layer structure and the cathode side diffusion layer structure.

* * * * *